Aug. 5, 1952 W. G. ALEXEWICZ ET AL 2,606,130
STRIPPING TISSUE
Filed July 16, 1948
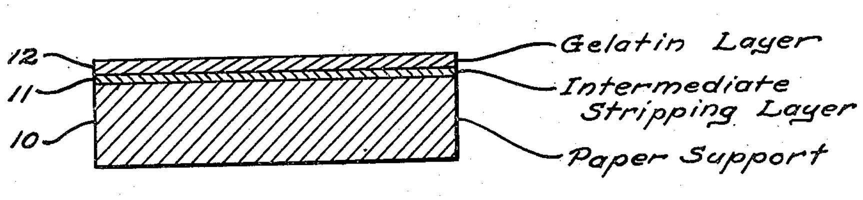
Inventors
Werner G. Alexewicz
Lawrence Plotin
Richard F. McGraw
Barkelew & Scantlebury
Attys.

Patented Aug. 5, 1952 2,606,130

UNITED STATES PATENT OFFICE 2,606,130

STRIPPING TISSUE

Werner G. Alexewicz, Burbank, Lawrence Plotin, North Hollywood, and Richard F. McGraw, Sierra Madre, Calif., assignors, by mesne assignments, to Richard F. McGraw, doing business as McGraw Colorgraph Company, Burbank, Calif.

Application July 16, 1948, Serial No. 39,116

1 Claim. (Cl. 117—76)

This invention concerns generally an improved stripping tissue of the type employed in certain of the photographic arts. Our improved stripping tissue, in common with many previously known products, comprises a temporary supporting sheet, ordinarily of paper; a film of unhardened gelatin; and an intermediate layer between and temporarily uniting the supporting sheet and the gelatin film. The intermediate layer has the dual function of forming a firm and effective bond between the gelatin and the paper temporary support while the stripping tissue is dry; and of effectively releasing the soft gelatin layer after the stripping tissue has been immersed for a short time in water (or in a weak aqueous solution) and the exposed gelatin surface has been pressed into firm contact with a suitable new support. The present application is a continuation in part of our copending application, Serial No. 634,278, filed December 11, 1945.

Previous stripping tissues of a type which might be used with soft gelatin layers depend for stripping action upon application of a solution which is a solvent for the material of the stripping layer. That has the obvious disadvantage of raising the possibility of contaminating the gelatin layer either with the solvent itself or with the dissolved material of the stripping layer, and thus interfering with the subsequent processing. Such contamination may in some instances be avoidable in theory by sufficient washing of the gelatin layer after stripping, but in practice there is the danger that enough of the material of the stripping layer may remain to affect later processing either chemically or by affecting such physical properties of the soft gelatin as the degree of its swelling and the rate of diffusion of various substances through it. Any such effect is rendered more serious by the probability that different areas of the gelatin will be affected differently, yielding a mottled or otherwise non-uniform final product.

An important advantage of the present invention is the complete elimination of any such contamination of the gelatin layer. That is accomplished by providing a stripping layer which is insoluble in water and in solutions ordinarily encountered in the art, and which does not depend for its stripping action upon being wholly or partially dissolved. Hence, during transfer of the gelatin layer to a new support the entire stripping layer remains firmly attached to the temporary paper support, and is removed with it. Whether pure water is used as the stripping bath, or whether that bath is a dilute alkaline or acid solution, no part of the stripping layer is dissolved. Hence the soft gelatin layer comes out of the transfer on its new support without possibility of contamination by dissolved material of the stripping layer.

The invention is particularly effective in connection with layers of pigmented unhardened gelatin of the type used for making photographic prints by the carbro and the carbon processes, both of which involve formation of an image of selectively hardened gelatin within the layer of initially soft gelatin. Such gelatin layers are considerably thicker than the gelatin layers ordinarily used for other photographic processes. A stripping layer which is suitable for use with a relatively thin or hard layer of gelatin is not necessarily practicable for use with the relatively thick and soft carbon and carbro gelatin layers, for which the present invention is particularly well adapted.

A complete understanding of our invention and of its further objects and advantages will be had from the following detailed description of a preferred manner of carrying it into effect and of certain typical illustrative processes in which it finds useful application. The accompanying drawing forms a part of that description and is a schematic section taken transversely through a stripping tissue in accordance with the invention.

We have found that a stripping tissue with the desirable properties described above can be made in the following way. The paper support 10 is coated with a solution of vinyl acetate resin, a polymerization product of vinyl acetate (such as type AYAT supplied commercially by Carbide and Carbon Chemicals Corp.), dissolved in a suitable volatile solvent, which may be, for example, a mixture of approximately 75% isopropyl alcohol, 5% acetone and 20% water. After the resulting stripping layer 11 has dried, the layer 12 of unhardened gelatin is coated on top of it by the usual coating procedure.

In applying stripping layer 11 it is important to control its thickness closely. This is done by properly regulating the rate of coating and the viscosity of the solution, which in turn depends primarily upon the concentration of resin in the solution and upon the temperature. The proper thickness is such that after the stripping layer has dried the surface of the paper is just covered essentially completely. If paper fibers protrude beyond the stripping layer to too great an extent, they will so increase the bond with the gelatin layer as to prevent easy stripping. If, on the other hand, the stripping layer is made thicker than is necessary to cover the paper, it is likely to have too smooth a surface, so that the bond with the gelatin will be relatively weak and may be broken during storage or handling. By suitable selection and control of the various factors during the coating process, the resulting resin layer can be caused to have a thickness such as has been described, and the layer will then form a suitable intermediate layer for a stripping tissue.

The amount of resin required per unit area to form a satisfactory stripping layer depends largely upon the depth of penetration of the solution into the paper before evaporation of the solvent. Conditions which lead to fast drying, such as low humidity, for example, usually require a coating solution of lower resin concentration, other factors remaining the same.

When paper of the type of photographic raw paper is used, ordinary coating methods are generally found to give a layer of the required thickness if the concentration of vinyl acetate resin in the coating solution (using, for example, the preferred solvent composition defined above) has some definite value between about 3 and about 8% of the solution by weight, depending upon the exact conditions used. That assumes conditions of temperature, humidity, coating speed and the like within the normally encountered ranges. When any of those factors are abnormal, or when a special type of paper is used, it may be desirable to use a resin concentration which is not included in the above stated range. For example, with a paper less porous than usual a resin concentration as low as 2% may be advisable. In practice it is most convenient to hold other factors substantially constant and to vary the resin concentration of the coating solution until a suitable coating, as defined above, is obtained. In general, with photographic raw paper of the type normally used, a suitable finished stripping layer in accordance with the invention is found to have between 0.8 and 1.8 grams of resin per square foot of paper surface, depending primarily upon the depth of penetration of the resin into the paper. The extreme lightness of such a coating is apparent from the equivalent thickness of the resin layer (assuming a homogeneous layer for purposes of illustration). The range of 0.8 to 1.8 grams per square foot corresponds to an equivalent thickness of only about 0.0003 to 0.00065 inch.

The gelatin layer 12, which is coated in the usual manner and which directly overlies the stripping layer just described, may vary considerably according to the type of process for which the stripping tissue is intended. However, the gelatin layer is unhardened and should have a thickness of at least 0.0015 inch.

In the stripping process, the stripping tissue is first soaked briefly in water or in a weak aqueous solution until the exposed gelatin surface becomes tacky. An advantage of stripping tissue in accordance with the present invention is the fact that the stripping bath in which the gelatin is rendered tacky is not limited to any particular pH characteristic, but may be slightly alkaline, neutral or slightly acid. Particularly for use with the carbro process, a slightly acid stripping bath is preferred. When the gelatin has become tacky but is not yet fully swelled, its exposed surface is brought into contact with the face of the new support to which it is to be transferred, and firm adhesion is established by pressure.

The new support may be of any material to which the swelled gelatin will adhere firmly, paper or a plastic sheet having a grained surface being preferred. Since the adhesion between the gelatin and the new support is greater than that between the gelatin and the intermediate stripping layer, when the paper temporary support is stripped away the entire intermediate layer is removed with it, leaving the coherent gelatin layer on the new support.

An important illustrative application of the new type of stripping tissue is in making photographic prints by the carbro process when a final picture of the highest quality is desired. For that purpose the gelatin layer of the stripping tissue contains a suitable pigment dispersed in it. That pigment may, for example, be carbon black if a black and white print is to be made, or may be any of a wide variety of colored pigments. In either instance a pigmented stripping tissue made in accordance with the invention has marked advantages over the conventional non-stripping "carbon tissues" previously available.

In the carbro process, as ordinarily carried out, a positive bromide print is first made and processed in the usual manner. A carbon tissue, comprising ordinarily a pigmented gelatin layer coated on a paper support without any intermediate stripping layer, is then sensitized by soaking in a suitable well-known aqueous solution, and the outer face of the pigmented gelatin layer is brought into contact with the bromide emulsion, intimate contact being established by pressure. Chemical action forms a latent image of hardened pigmented gelatin extending inward from the gelatin-bromide interface. The pigmented tissue is then separated from the bromide and is wet and squeegeed face down upon a developing support, which is typically a sheet of plastic. The image is "developed" in hot water, which first melts the unhardened tissue gelatin, releasing the paper backing which can then be stripped off, and then dissolves all the remaining soft gelatin, leaving the image of hardened pigmented gelatin adhering to the surface of the developing support. After drying, the gelatin image can be re-soaked and transferred to any desired permanent support, such as paper.

We have found that the skin of hard gelatin which gradually forms upon the exposed surface of a pigmented gelatin layer during storage frequently leads to difficulty in obtaining completely clear highlights in a carbro print. When a latent image is produced in that same surface, as in the ordinary carbro process, the hard skin becomes essentially a part of that image. When such a latent image is transferred to another support for development, and the remaining soft portion of the gelatin is dissolved away, even the lightest parts of the developed image will contain a certain minimum thickness of pigmented gelatin, corresponding to the depth to which the surface hardening had progressed before the paper was used.

This effect is avoided in our new process by use of the special pigmented gelatin stripping tissue described above, which makes it possible to alter the usual procedure in the following illustrative manner. Before the pigmented gelatin layer is sensitized and contacted to the bromide print, it is transferred from its original paper support to another, preferably relatively rigid, support. That transfer is accomplished, as indicated above, by briefly soaking the stripping tissue in water to swell the gelatin, then pressing the exposed gelatin surface into firm contact with the new support, stripping off the temporary paper support and the stripping layer attached to it, and drying the gelatin layer on its new support. The gelatin on its new support is then sensitized and contacted to the bromide print, the remainder of the process being carried out substantially as usual.

It will be seen that a result of the improved procedure just described is that the bromide print comes in contact with that face of the pigmented gelatin which was initially covered and protected by the intermediate layer, and which is therefore still uniformly soft. When a latent image is formed in this freshly exposed surface, as by contact with a bromide print, the extreme high light areas of the image may be entirely free of hardened gelatin. During development those areas will therefore wash out completely, leaving clear unveiled high lights in the developed image. The original hardened skin is on the opposite side of the gelatin layer from the image, and is everywhere separated from the image by still soft gelatin (since the gelatin layer is always thicker than the thickest parts of the image). When the soft gelatin is dissolved away during development, the hardened skin adheres to the contacting support and is thus completely removed, leaving the uncontaminated image upon the assembly support. Such a disposal of the original surface layer of the pigmented gelatin cannot be obtained in the ordinary carbro process, nor by any carbro process using conventional non-stripping tissues.

Moreover, the advantages of obtaining a fresh gelatin surface in which to form the latent image cannot be fully exploited if the process of obtaining that fresh surface results in the possibility of contaminating the very thing desired. As has been explained, with a stripping layer in accordance with the invention, such contamination is avoided, and the described improved carbro process can therefore be counted on to give uniformly satisfactory results.

When color photographs are to be printed by the usual carbro process, in which the various color component images are separately formed and then assembled in registered superposition, the problem of obtaining completely clear highlights is increasingly difficult. The difficulty can be overcome in that operation also by using pigmented stripping tissues in accordance with the invention, and by forming each of the three or more color component images in a freshly exposed surface of pigmented gelatin. A coordinated procedure for carrying out such a color printing process is described in the above identified copending patent application. Further useful application of the present invention in carbro printing are also described in the said copending application, including the production of carbro color prints with automatic instead of manual registration of the component color images.

The above description of a typical embodiment of our invention is intended to be illustrative of the various forms in which the invention can be carried out, and is not intended as a limitation upon the scope of the invention, which is defined in the following claim.

We claim:

A stripping tissue for use in making color prints by the carbro or carbon process comprising a paper support, a stripping layer coated on one face only of the paper support, and a layer of pigmented unhardened gelatin at least 0.0015 inch thick coated directly on the stripping layer, the gelatin layer being bodily separable from the stripping layer after the stripping tissue has been soaked in an aqueous liquid without changing the physical state of the stripping layer, the stripping layer comprising vinyl acetate resin in amount between about 0.8 and 1.8 grams of resin per square foot of paper, said stripping layer being insoluble in aqueous liquids and being of such thickness as to substantially completely cover and follow the surface contour of the paper support whereby substantially no paper fibres extend up through the stripping layer, so that gelatin layer will be bonded to the stripping layer enough to withstand separation during storage and handling but not enough to prevent its separation when the gelatin layer of the wetted tissue is pressed into contact with a second support.

WERNER G. ALEXEWICZ.
LAWRENCE PLOTIN.
RICHARD F. McGRAW.

REFERENCES CITED

The following references are of record in the file of this patent:

UNITED STATES PATENTS

| Number | Name | Date |
|---|---|---|
| 1,627,935 | Stinchfield | May 10, 1927 |
| 1,933,824 | Seel | Nov. 7, 1933 |
| 2,168,051 | Smith et al. | Aug. 1, 1939 |
| 2,237,017 | Thinius | Apr. 1, 1941 |